Nov. 10, 1970    T. V. WILLIAMS    3,538,649
APPARATUS FOR SHARPENING MULTIEDGE TOOLS
Filed Sept. 23, 1968
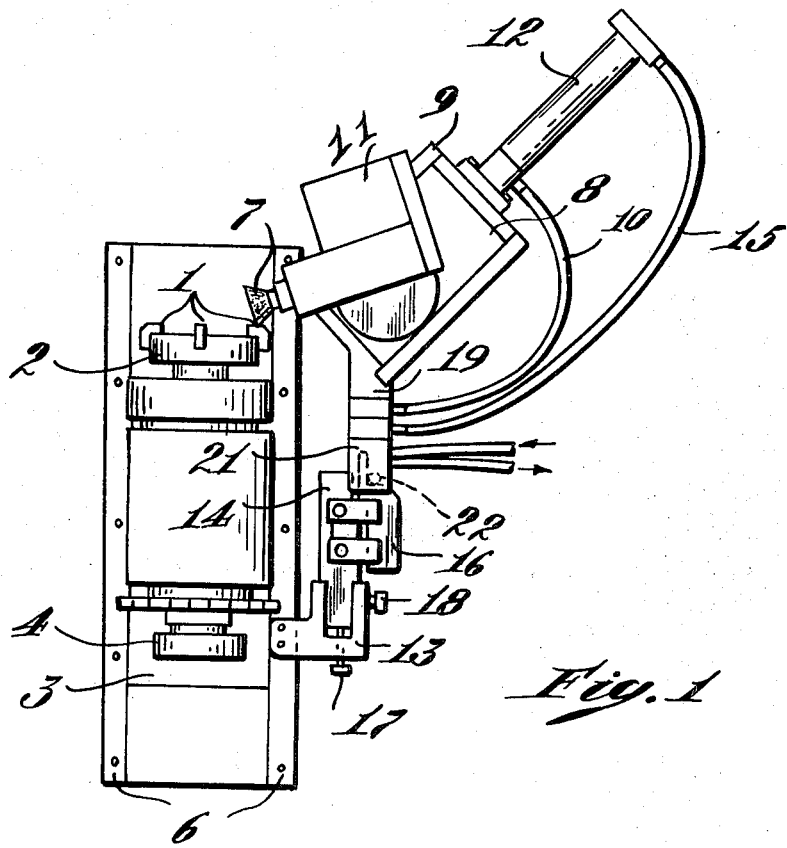
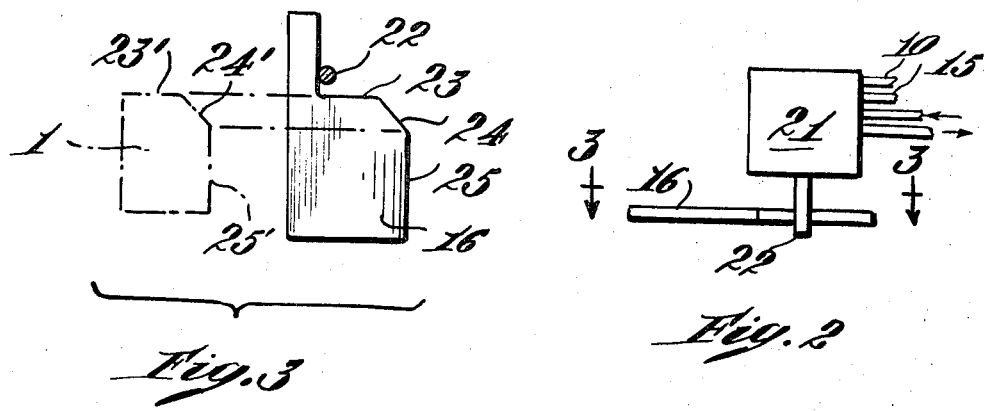
Inventor
Thurston V. Williams
by Roberts, Cushman & Grover
Att'ys

United States Patent Office 3,538,649
Patented Nov. 10, 1970

3,538,649
APPARATUS FOR SHARPENING MULTIEDGE TOOLS
Thurston V. Williams, Wilton, N.H.
(% The O.K. Tool Company Inc., Milford, N.H. 03055)
Filed Sept. 23, 1968, Ser. No. 761,630
Int. Cl. B24b 17/00
U.S. Cl. 51—100     4 Claims

ABSTRACT OF THE DISCLOSURE

For sharpening a tool having cutting edges disposed at an angle to each other, apparatus comprising tool and sharpener carriages movable along intersecting paths, the sharpener path bisecting said angle, a template having guide edges parallel to said cutting edges respectively, a follower to follow the outline of the template, and control means sensing the template for causing the sharpener to follow the outline of the tool, the template being mounted on the tool carriage and the follower on the sharpener carriage.

---

This invention relates to multiedge tools having edges extending transversely of each other, such as milling cutters having transverse cutting edges on their ends and longitudinal cutting edges on their peripheries. They may also have curved or beveled edges, as for example edges joining the aforesaid edges. Heretofore it has been customary to sharpen the different edges in separate operations.

Objects of the present invention are to provide apparatus which sharpens all of the edges in a continuous operation, which is simple and economical to produce, which can be easily and quickly adjusted to sharpen tools of different outlines, and which is durable and reliable in use.

This invention involves apparatus for sharpening a cutting tool having longitudinal and transverse cutting edges disposed at an angle to each other, the apparatus comprising a tool carriage movable along a first path, means for mounting said tool on the carriage with said longitudinal edge extending lengthwise of the path, a sharpener carriage movable along a second path, means for mounting a sharpener on the sharpener carriage for sharpening said tool, said second path bisecting said angle so that the sharpener may engage both of said edges, a template having guide edges corresponding to said cutting edges respectively, a follower to follow the outline of the template, the template being mounted on one of said carriages and the follower being mounted on the other carriage, and control means for sensing the template as the carriages move along their paths so that the sharpener follows the outline of the tool. Preferably the template is mounted on the tool carriage and the follower is mounted on the sharpener carriage, said control means comprises a piston and cylinder for actuating the sharpener carriage and means actuated by the follower for controlling the piston and cylinder, and said angle is not greater than 90°.

For the purpose of illustration a typical embodiment of the invention is shown in the accompanying drawing in which FIG. 1 is a plan view;
FIG. 2 is a side view from the right of FIG. 1; and
FIG. 3 is a section on line 3—3 of FIG. 2.

The particular embodiment of the invention chosen for the purpose of illustration is constructed to sharpen bits 1 which are shaped as shown in FIG. 3 and are mounted in a holder 2 rotatably mounted on a carriage 3 with a handle 4 for turning the bits successively into sharpening position. The carriage 3 is slidably supported on a bed 6 in the usual way.

The sharpener 7, in the form of abrasive material, is adjustably mounted on a carriage 8 which is slidably mounted in a base 9 and is driven by a motor 11. The carriage is moved back and forth on the base 9 by a piston and cylinder 12.

According to this invention the tool carriage 3 has a lateral extension 13 carrying a holder 14 for a template 16, the holder being adjustable longitudinally and transversely by screws 17 and 18. As shown in FIG. 3 the template has the same shape as the bit 1. The sharpener carriage 8 has an extension 19 carrying a tracer 21 which may be of any suitable construction such as the MIMIK made by Mimik Tracers, Inc., Aurora, N.Y. As is well known the tracer has an inlet and an outlet for fluid under pressure, connections 10 and 15 to the two ends of cylinder 12, internal valves for admitting fluid to either end of the cylinder, and a follower 22 for controlling the valves in cooperation with the template 16.

A typical use of the invention is to place the tool carriage in the position shown in FIGS. 1 and 3 with the tool 1 spaced from the sharpener 7, lengthwise of the carriage path, a distance slightly less than the distance from the follower 22 to the transverse surface 23 of the template. The tool carriage is then moved forward (upward in FIG. 1) until the surface 23 engages the follower and the end of the bit engages the grinder 7. The engagement of surface 23 with the follower 22 causes the sharpener carrier 8 to retract. As the tool carrier continues to advance and the sharpener carriage retracts, the grinder 7 moves across the end 23' of the bit and the follower moves across the transverse surface 23 of the template. When the surface 24 of the template reaches the follower the tracer 21 causes the grinder carriage to retract more slowly while the surface 24 moves past the follower and the surface 24' of the bit moves past the grinder. When the surface 25 of the template reaches the follower the tracer causes the sharpener carriage to advance, thereby to continue to hold the follower against the surface 25 while the tool carriage continues to advance and grind the longitudinal edge 25' of the tool.

As shown in FIG. 1 the path of the slidable sharpener carriage 8 is oblique to the path of the slidable tool carriage 3 and bisects the angle between the transverse and longitudinal surfaces 23' and 25' of the bit 1. Preferably the angle between the two paths is 45° and the path of the sharpener carriage bisects the aforesaid angle midway.

I claim:
1. For sharpening a cutting tool having longitudinal and transverse cutting edges disposed at an angle to each other, apparatus comprising a tool carriage movable along a first path, means for mounting said tool on the carriage with said longitudinal edge extending lengthwise of the path, a sharpener carriage movable along a second path, means for mounting a sharpener on the sharpener carriage for sharpening said tool, said second path bisecting said angle so that the sharpener may engage both of said edges, a template having guide edges corresponding to said cutting edges respectively, a follower to follow the outline of the template, the template being mounted on one of said carriages and the follower being mounted on the other carriage, and control means sensing the template for causing the sharpener to follow the outline of the tool.

2. Apparatus according to claim 1 wherein the template is mounted on the tool carriage and the follower is mounted on the sharpener carriage.

3. Apparatus according to claim 1 wherein said control means comprises a piston and cylinder for actuating the sharpener carriage and means actuated by the follower for controlling the piston and cylinder.

4. Apparatus according to claim 1 wherein said angle is not greater than 90°.

References Cited

UNITED STATES PATENTS

| | | | |
|---|---|---|---|
| 2,477,135 | 7/1949 | Marker et al. | 51—100 |
| 3,162,987 | 12/1964 | Cronin et al. | 51—288 |

OTHELL M. SIMPSON, Primary Examiner

U.S. Cl. X.R.

51—288